June 26, 1956  W. R. J. WOOCK  2,752,276
PLASTIC WEB-SHEET AND METHOD OF MAKING SAME
Filed Dec. 11, 1950

INVENTOR
Walter R. J. Woock
BY
ATTORNEYS

United States Patent Office 2,752,276
Patented June 26, 1956

2,752,276

PLASTIC WEB-SHEET AND METHOD OF MAKING SAME

Walter R. J. Woock, Lodi, Calif., assignor to Plastaket Manufacturing Company, Lodi, Calif., a limited partnership Application December 11, 1950, Serial No. 200,149

3 Claims. (Cl. 154—46)

This invention relates generally to the manufacture of a plastic web-sheet; i. e. a sheet or section of lattice or web-like configuration made from high impact nylon plastic or the like; this application being a continuation-in-part of application Serial No. 179,756, filed August 16, 1950, now abandoned.

The plastic web sheet is of a novel design adapted to sundry uses, as in lattice-type produce baskets or box liners formed integral from plastic; or in sheets used generally flat as a material screen or classifier which is tough, durable, and stainless.

A major object of the invention is to provide a lattice or web-sheet of plastic which is light weight, strong and stable, and from one side presents no projection. Such one side—when in a plastic produce basket—is innermost whereby there is no projection to mar or cut the produce disposed in the basket for shipment and sale.

An additional object of the invention is to provide a plastic web-sheet, and method of manufacture thereof, which simplifies and facilitates economical production in quantity.

Still another object of the invention is to provide a practical web-sheet of plastic, and a reliable method and die unit for making the same.

These objects are accomplished by means of such structure and relative arrangement of parts as will fully appear by a perusal of the following specification and claims.

Figure 1:
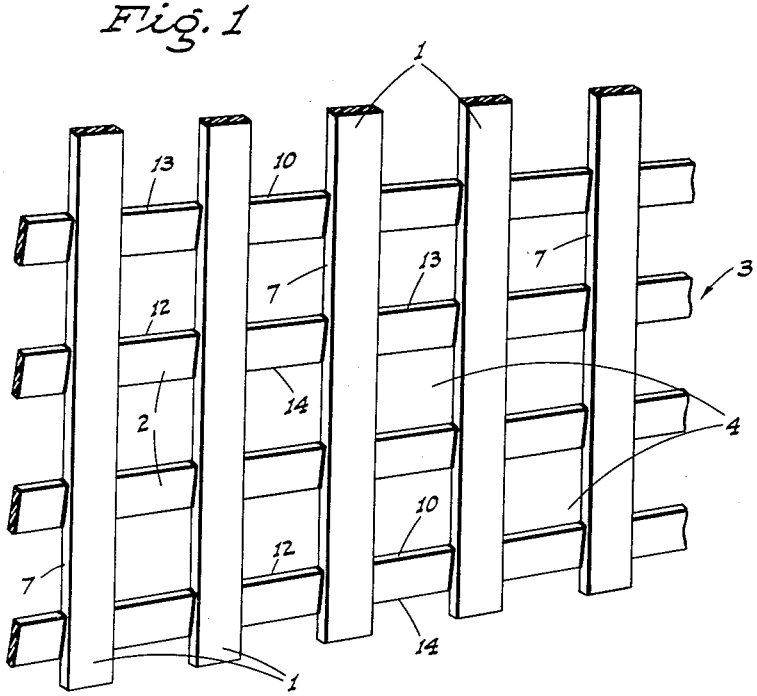
Fig. 1 is an enlarged fragmentary perspective view of the plastic web-sheet.
Figure 2:
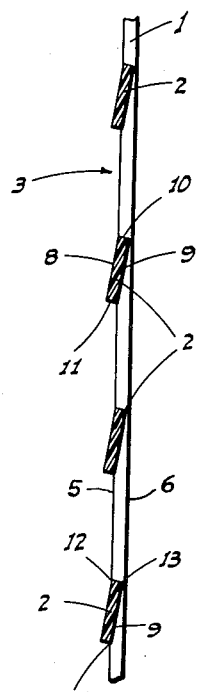
Fig. 2 is a fragmentary transverse sectional elevation of such web-sheet.

Referring now more particularly to the characters of reference on the drawings, the novel, plastic web-sheet comprises—in symmetrical intersecting relation—a plurality of flat upstanding bars 1 spaced apart in parallelism, and a plurality of flat horizontal rails 2 likewise spaced apart in parallelism. With this arrangement, a lattice-like sheet or web-sheet is produced, such web-sheet being indicated generally at 3.

The web sheet 3, including the bars 1 and horizontal rails 2, which define a multiplicity of openings 4, is integral, of plastic, and constructed as follows:

The upstanding bars 1 are horizontally elongated and rectangular in sectional plan; such bars including an outer face 5; an inner face 6; and side edges 7.

The flat rails 2 are vertically elongated and rectangular in sectional elevation; such rails each including an outer face 8; an inner face 9; an upper edge 10; and a lower edge 11.

In order that there may be no projection from the inner face of the web-sheet 3, and also to facilitate manufacture of such web-sheet in a two-part punch and cavity die, as will hereinafter appear, the rails 2 bear the following relationship to the bars 1.

Each rail 2 inclines downwardly and outwardly from its upper edge 10 to its lower edge 11; such rail being of slightly less thickness than the adjacent upstanding bars 1, with the disposition and inclination of the rail such that its upper edge is wholly between the faces 5 and 6 of said rails. The upper and outer longitudinal corner 12 of each rail 2 is flush or alined with the outer face 5 of the adjacent bars 1, while the upper and inner longitudinal corner 13 of each rail is disposed adjacent but short of the inner face 6 of such bars.

Also, the inclination of each rail 2 is such that its lower and inner longitudinal corner 14 is alined or flush with the outer face 5 of the adjacent bars 1.

With the web-sheet 3 constructed as above, it will be evident that there are no inward projections by the rails 2 with respect to the inner face 6 of the bars 1; this being a major advantage in many cases, as when the web sheet 3 is included in the manufacture of a plastic produce basket. The absence of inward projections prevents marring, puncturing, or cutting of the produce packed in the basket; the flat bars 1 engaging the produce in the basket without damaging effect. Also, as the rails 2 incline downwardly and outwardly and extend outwardly of the bars 1, as described, air circulation upwardly into the basket and about the produce is invited, minimizing the possibility of molding or rotting.

The foregoing description pertains to the plastic web-sheet as incorporated in a lattice-type integral basket or the like; the use of the web-sheet flat, as a material screen or classifier, being hereinafter generally described.

Figure 3:
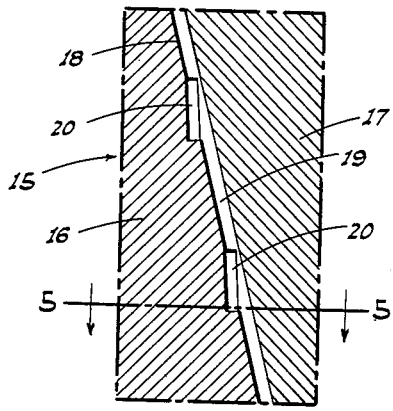
Fig. 3 is a fragmentary transverse sectional elevation of the die unit, in closed position, with the view taken at one of the bar channels.
Figure 4:
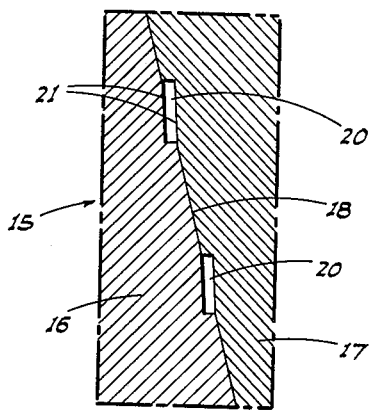
Fig. 4 is a similar view, but is taken between adjacent bar channels.
Figure 5:
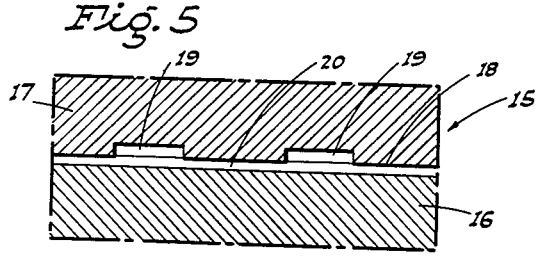
Fig. 5 is a fragmentary sectional plan view of the die unit, with the view taken at one of the rail channels.

The web-sheet 3, when in a basket, is especially adapted for manufacture in a two-part punch and cavity die as illustrated in Figs. 3–5 inclusive.

The die unit is indicated generally at 15 and includes a cavity 16 and a punch 17; the punch being adapted for direct upward or vertical withdrawal from the cavity 16.

The line of engagement and separation between the cavity 16 and punch 17 is indicated at 18, and such line diagonals or is inclined upwardly with respect to the vertically upward direction of travel of the punch 17 as the latter is withdrawn.

The bars 1 are formed in the die unit 15 by vertical channels 19 cut wholly in the punch 17 and opening to its working face.

The horizontal channels 20 in the die unit 15 are cut half in the cavity 16 and half in the punch 17, with the extended line of engagement and separation 18 diagonaling between opposed upper and lower corners of said channels 20. Opposite sides or bottoms 21 of the channels 20 are vertical; i. e. are parallel to the line of withdrawing motion imparted to the punch 17. As a consequence the punch 17 may be withdrawn from the cavity 16 without any obstruction being occasioned by the rails 2 formed in the channels 20, and of course the bars 1, by reason of their upstanding position, freely clear the parts of the die unit.

With a die unit 15 constructed as above, plastic web-sheet articles can be manufactured rapidly, effectively, and economically in a two-part punch and cavity type die.

When the web-sheet is produced for use flat as a material screen or classifier (the sheet being suitably mounted and actuated), the bars 1 and rails 2 then lie generally in a horizontal plane and with the rails extending transversely of the direction of movement of the material. Also, such rails then incline upwardly from the edges 10 with the edges 11 uppermost and projecting above the top surface of the bars 1. This is an advantage as the upward projection of said rails tends to break up adhered pieces of material on the sheet or screen, accelerating the screening or classifying action. A further advantage of the rails 2 being inclined, as above, is that the lower corners of edges 11 and upper corners of edges 10 form mesh openings therebetween of pinpoint gauge so that material passing through the mesh is freely released without any substantial abrasive friction or plugging. When the web-sheet is produced in a flat section for use as a screen or classifier, such section may be made in a two-part vertically separable plate die.

From the foregoing description it will be readily seen that there has been produced such a plastic web-sheet and method and die unit for making the same as substantially fulfills the objects of the invention, as set forth herein.

While this specification sets forth in detail the present and preferred construction of such a plastic web-sheet and method and die unit for making the same, still in practice such deviations from such detail may be resorted to as do not form a departure from the spirit of the invention, as defined by the appended claims.

Having thus described the invention, the following is claimed as new and useful, and upon which Letters Patent is desired:

1. In an integral plastic web-sheet comprised of a plurality of bars and rails intersecting in lattice arrangement; each rail inclining downwardly and laterally outwardly from its upper longitudinal edge when the web-sheet is in upstanding position, and said upper longitudinal edge of each rail being disposed wholly between the faces of the adjacent bars; the lower and inner longitudinal corner of each rail being alined with the outer face of said adjacent bars.

2. In an integral plastic web-sheet comprised of a plurality of bars and rails intersecting in lattice arrangement; each rail being of less thickness than the adjacent bars and inclining downwardly and laterally outwardly from its upper longitudinal edge when the web-sheet is in upstanding position, the upper and outer longitudinal corner being alined with the outer face of the adjacent bars, and the upper and inner longitudinal corner being adjacent but short of the inner face of said bars.

3. In an integral plastic web-sheet comprised of a plurality of bars and rails intersecting in lattice arrangement; each rail being of less thickness than the adjacent bars, and inclining downwardly and laterally outwardly from its upper longitudinal edge when the web-sheet is in upstanding position, the upper and outer longitudinal corner, together with the lower and inner longitudinal corner, of each rail being alined with the outer face of the adjacent bars, and the upper and inner longitudinal corner being adjacent but short of the inner face of said bars.

References Cited in the file of this patent

UNITED STATES PATENTS

| | | |
|---|---|---|
| 748,669 | Valentine | Jan. 8, 1904 |
| 1,117,568 | Hart | Nov. 17, 1914 |
| 1,186,775 | Heffernan | June 13, 1916 |
| 1,436,853 | Berry | Nov. 28, 1922 |
| 1,652,128 | Hare | Dec. 6, 1927 |
| 1,822,298 | Kerrigan | Sept. 8, 1931 |
| 2,241,512 | Greulich | May 13, 1941 |
| 2,367,962 | Reibold et al. | Jan. 23, 1945 |
| 2,399,117 | Hart | Apr. 23, 1946 |
| 2,547,632 | Ewing et al. | Apr. 3, 1951 |